United States Patent [19]

Iwasaki et al.

[11] Patent Number: 5,930,462
[45] Date of Patent: Jul. 27, 1999

[54] PRINTING APPARATUS

[75] Inventors: Yoichi Iwasaki; Akihiro Nishi, both of Kobe; Satoshi Yoshida, Machida, all of Japan

[73] Assignee: Minolta Co., Ltd., Osaka, Japan

[21] Appl. No.: 08/723,832

[22] Filed: Sep. 30, 1996

Related U.S. Application Data

[63] Continuation of application No. 08/361,468, Dec. 22, 1994, abandoned, which is a continuation of application No. 08/069,670, Jun. 1, 1993, abandoned, which is a continuation of application No. 07/752,784, Aug. 30, 1991, abandoned.

[30] Foreign Application Priority Data

Aug. 31, 1990 [JP] Japan ................................ 2-231193
Aug. 31, 1990 [JP] Japan ................................ 2-231195

[51] Int. Cl.⁶ .................................................. G06K 15/00
[52] U.S. Cl. ........................................... 395/113; 395/112
[58] Field of Search .................................. 395/101, 110, 395/112, 113, 114, 115, 826, 836–839, 879; 358/437, 444, 468; 400/61, 71, 76

[56] References Cited

U.S. PATENT DOCUMENTS

| | | | |
|---|---|---|---|
| 4,273,439 | 6/1981 | Markham et al. .................... | 355/14 C |
| 4,527,885 | 7/1985 | Ayata et al. ............................. | 355/468 |
| 4,623,244 | 11/1986 | Andrews et al. ........................ | 355/24 |
| 4,754,428 | 6/1988 | Schultz et al. ......................... | 395/114 |
| 4,947,345 | 8/1990 | Paradise et al. ........................ | 395/114 |
| 5,014,221 | 5/1991 | Mogal .................................... | 395/114 |
| 5,018,079 | 5/1991 | Shukunami et al. .................... | 395/112 |
| 5,075,874 | 12/1991 | Steeves et al. ......................... | 395/112 |
| 5,113,355 | 5/1992 | Nomura ................................. | 395/110 |
| 5,164,842 | 11/1992 | Gauronski et al. .................... | 358/444 |

FOREIGN PATENT DOCUMENTS

A 3-35863  5/1991  Japan .................... 395/114

OTHER PUBLICATIONS

Instruction Manual of a switiching unit "Chibi" of model DEB–131 and DEB–134 manufucatured by MICON Kogyo kabushiki kaisha, Tokyo, Japan, published on Jan. 10, 1985. (partial translation). Text translation only.

*Primary Examiner*—Arthur G. Evans
*Attorney, Agent, or Firm*—Burns, Doane, Swecker & Mathis, LLP

[57] ABSTRACT

A printing apparatus connectable to a plurality of external device, and which is capable of receiving print requests from other external device while printing print data transmitted from a single external device in accordance with a print request received therefrom.

4 Claims, 19 Drawing Sheets

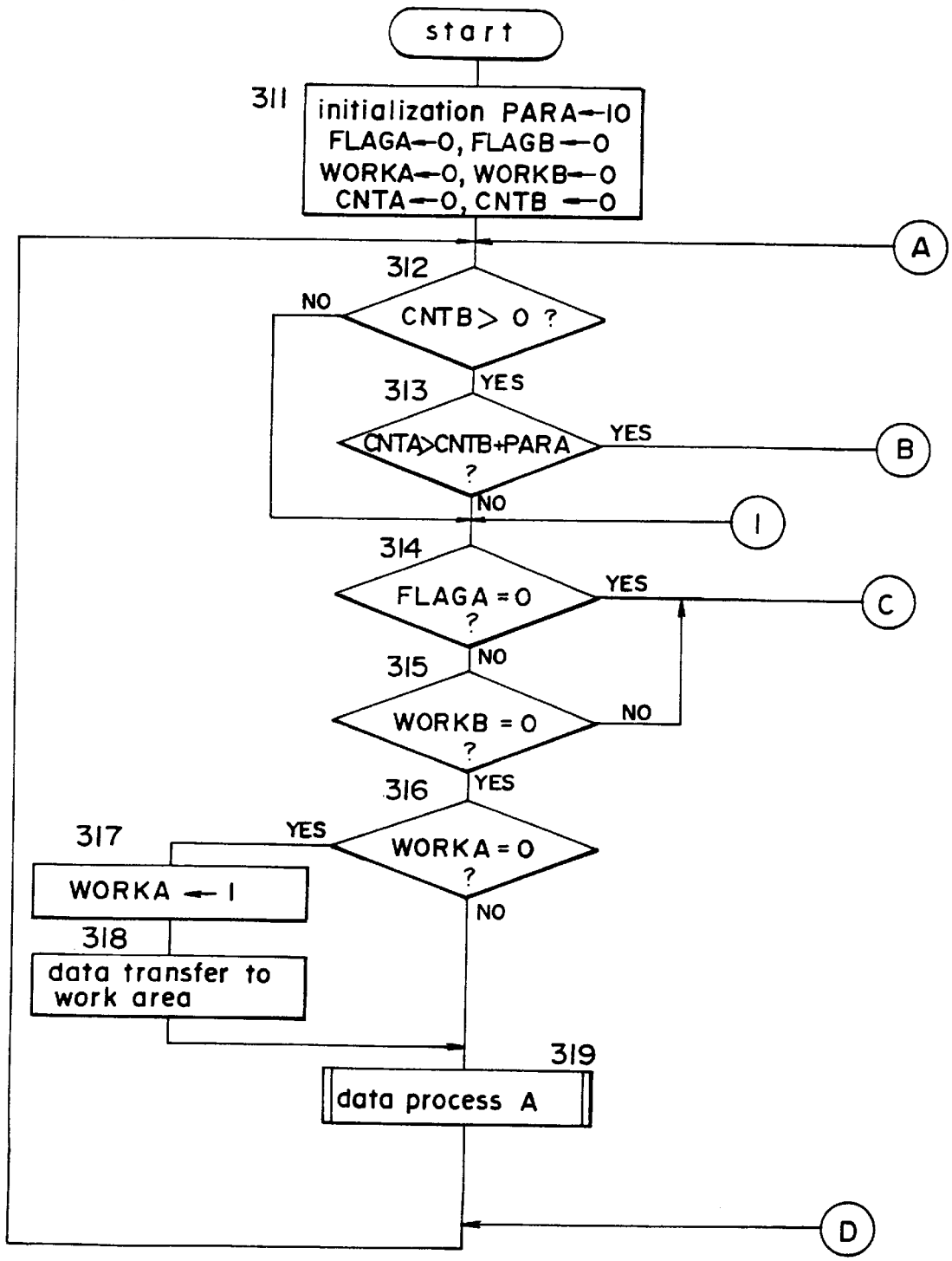

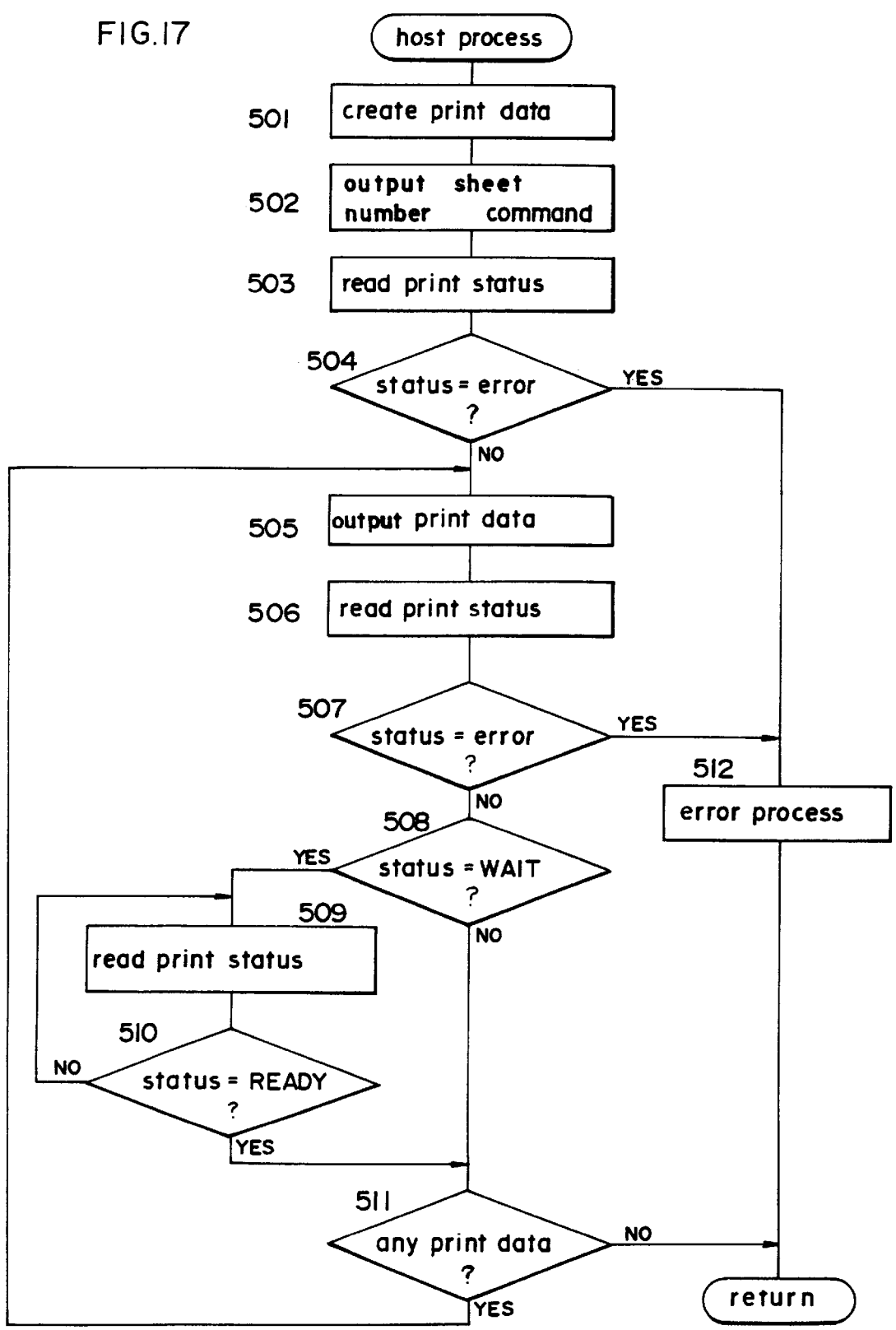

PRINTING APPARATUS

This application is a continuation of U.S. application Ser. No. 08/361,468, filed Dec. 22, 1994, now abandoned, which is a continuation of application Ser. No. 08/069,670, filed Jun. 1, 1993, now abandoned, which is a continuation of U.S. application Ser. No. 07/752,784, filed Aug. 30, 1991, now abandoned.

BACKGROUND OF THE INVENTION

1. Field of the Invention

The present invention relates to a printing apparatus connectable to a plurality of external devices.

2. Description of the Related Arts

Conventional printing apparatus have been provided for forming copy images based on print data transmitted from a personal computer, word processor or similar data processing device (hereinafter referred to as the "host"). Furthermore, printing apparatus connectable to a plurality of hosts have also been provided. The printing apparatus connectable to a plurality of hosts is provided a plurality of connectors for external device input, and print data input from the plurality of hosts to the printing apparatus can be accomplished by connecting signal cables between the aforesaid connectors and the various hosts.

The aforesaid type of printing apparatus allows a single printing apparatus to be commonly used as a printing means by a plurality of hosts without providing a selector for selectably switching among the plurality of host devices connected thereto. Such an arrangement is particularly logical from the perspectives of cost and space requirements.

Heretofore, printing apparatus have been unable to receive print requests from other hosts while printing print data transmitted from a single printing apparatus in accordance with a print request received therefrom. That is, conventional printing apparatus have a disadvantage inasmuch as during the time that the printing apparatus is being used by a single host, that printing apparatus is unavailable for use by other hosts connected thereto.

SUMMARY OF THE INVENTION

A main object of the present invention is to provide a printing apparatus connectable to a plurality of external devices, and which is capable of receiving print requests from other external devices while printing print data transmitted from a single external device in accordance with a print request received therefrom.

A further object of the present invention is to provide a printing apparatus which, when connected to a first and second host, gives priority to printing print data transmitted from the first host over printing print data transmitted from the second host, said printing apparatus being capable of receiving a print request from the first host when said first host transmits a print request during printing of print data transmitted from the second host.

A still further object of the present invention is to provide a printing apparatus which, when connected to a plurality of hosts and printing print data transmitted from a first host, is capable of determining whether or not a print request corresponding to print data copy conditions has been received from another host.

These objects of the present invention are achieved by providing a printing apparatus comprising:

image forming means for forming images based on print data transmitted from first and second external devices;

pausing means for pausing an image forming process executed by the image forming means when print data are transmitted from the second external device during the image forming process based on the print data received from the first external device, the print data transmitted from the second external device being given priority to that transmitted from the first external device for allowing the pause of the image forming process only when the print data are transmitted from the second external device during the image forming process based on the print data received from the first external device;

interrupt means for executing image forming process based on the print data received from the second external device after the pausing means pauses the image forming process based on the print data received from the first external device; and resuming means for resuming the image forming process based on the print data received from the first external device after the completion of the image forming process executed by the interrupt means based on the print data received from the second external device.

The aforesaid objects of the present invention are further achieved by providing a printing apparatus comprising:

image forming means for forming images based on print data transmitted from first and second external devices;

allowing means for allowing the interrupt of an image forming process based on the print data received from the second external device according to the image forming conditions of the print data received from the second external device when the print data are transmitted from the second external device during the image forming process of the print data received from the first external device;

pausing means for pausing the image forming process executed based on the print data received from the first external device by the image forming means when the allowing means allows the interrupt of the image forming process of the print data received from the second external device;

interrupt means for executing image forming process based on the print data received from the second external device after the pausing means pauses the image forming process based on the print data received from the first external device, and resuming means for resuming the image forming process based on the print data received from the first external device after the completion of the image forming process executed by the interrupt means based on the print data received from the second external device.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 2 is a flow chart showing a data process A of the embodiment shown in FIG. 1a;

FIG. 13a and 13b are flow charts showing all operations of the second embodiment of the invention;

FIG. 14 is a flow chart showing a data process A of FIG. 13a;

FIG. 17 is a flow chart showing the host operations of the second embodiment.

DETAILED DESCRIPTION OF THE PREFERRED EMBODIMENTS

The first embodiment of the invention is described below.

Figure 10:
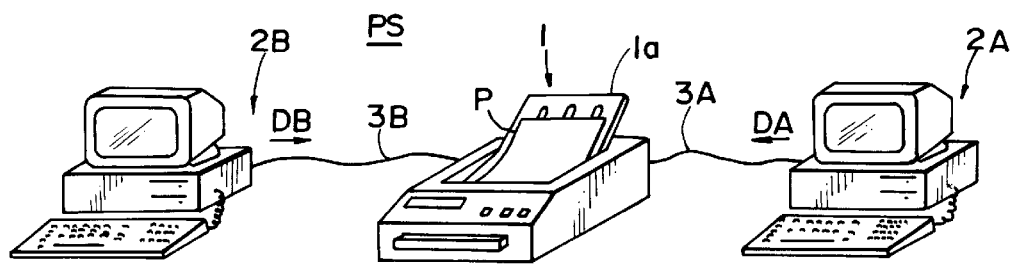
FIG. 10 is an exterior view of the printing system of the present invention.

The printing system PS shown in FIG. 10 comprises a laser printer 1 and two personal computers (hosts) 2A and 2B. The laser printer 1 is connected to each host 2A and 2B by means of the cables 3A and 3B, respectively. The hosts 2A and 2B transmit print data DA and DB comprising image data expressing character and graphic information, and control data, respectively.

The laser printer 1 forms images by means of a well known bit map method for writing image data as dot patterns. The papers P bearing the formed image thereon are discharged and stacked one sheet at a time on a tray 1a in the main unit.

Figure 8:
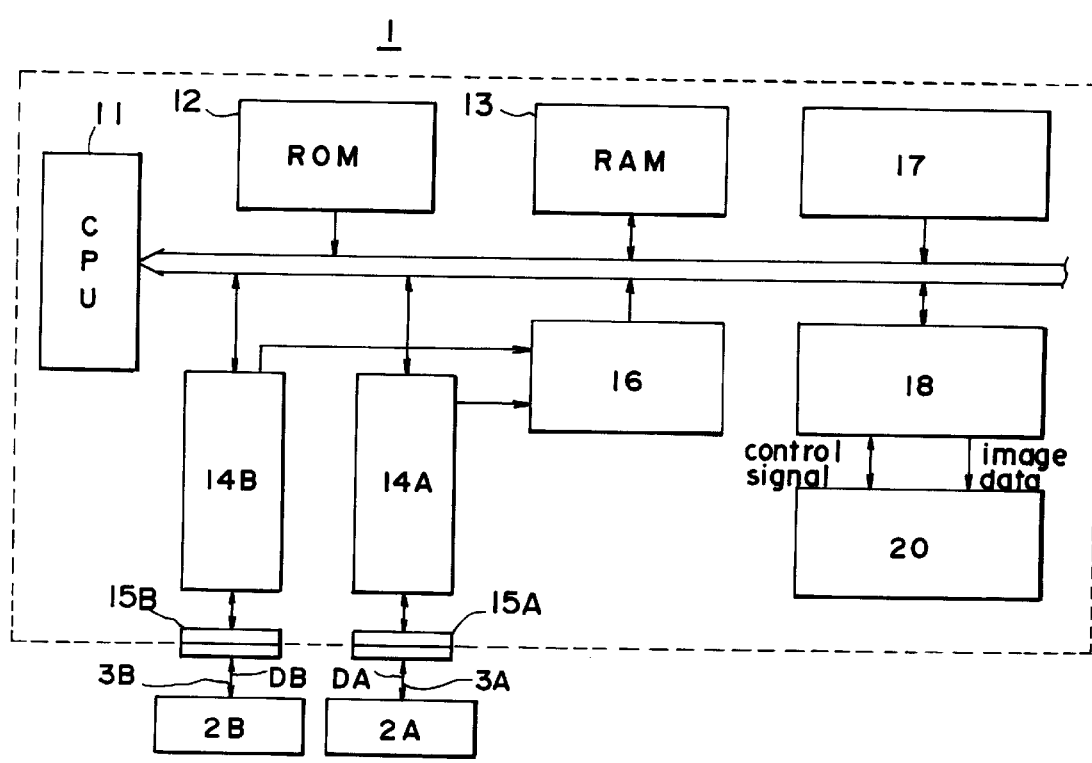
FIG. 8 is a block diagram showing the construction of the essential portion of the laser printer related to the present invention.

FIG. 8 is a block diagram showing the essential construction of the laser printer 1.

The laser printer 1 comprises a central processing unit (CPU) 11 for controlling all operations, a read only memory (ROM) 12 for storing process programs and the like, a random access memory (RAM) 13 for storing data (described later) and used as bit map memory, interfaces 14A and 14B used for input from external devices, an interrupt controller 16, a print engine 20 for forming images via an electrophotographic process using a laser light source, a print engine interface 18, and a dip switch interface 17.

The print data DA from the host 2A are input to the interface 14A through a connector 15A and a cable 3A. The print data DB from the host 2B are input to the interface 14B through a connector 15B and a cable 3B.

The interrupt controller 16 inputs the print data DA and DB to the interfaces 14A and 14B, and transmits the interrupt to the CPU 11. In the CPU 11, a receiving process (FIG. 7), described later, is executed as the interrupt process via the aforesaid pause request.

The laser printer 1 of the present embodiment is capable of assigning priority to either one of the interfaces 14A or 14B relative to the other via dip switches not shown in the drawing. That is, one of the interfaces 14A or 14B given precedence receives the print data and when printing is requested, the printing process is temporarily halted even if a printing process is currently being executed for print data of the other interface 14B or 14A, and the printing process of the interface 14A or 14B given priority is executed as a pause process.

Although the interface 14A connected to the host 2A is given priority in the following description, the interface 14B connected to the host 2B may alternatively be given priority.

Figure 9:
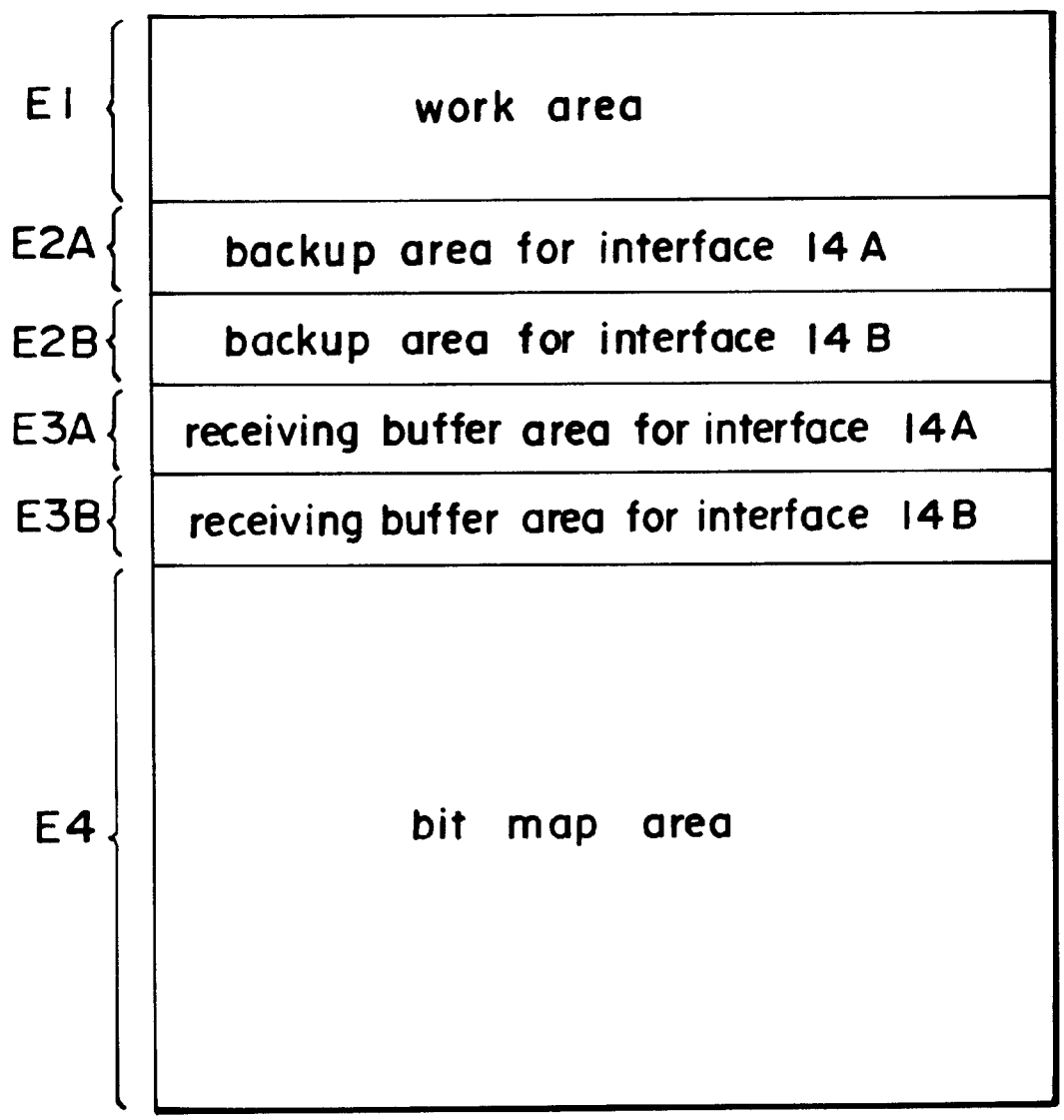
FIG. 9 is an illustration showing the assignment of the RAM memory area.

FIG. 9 is an illustration showing the memory area assignments of the RAM 13.

The RAM 13 is provided a work area E1 for temporary storage of various set values and parameters every time a printing process is executed, backup areas E2A and E2B for storing the print conditions (fonts, margins and the like) assigned by the print data DA and DB, respectively, receiving buffer areas E3A and E3B corresponding to the interfaces 14A and 14B, and a bit map area E4 for writing one-page image data.

Figure 1A:
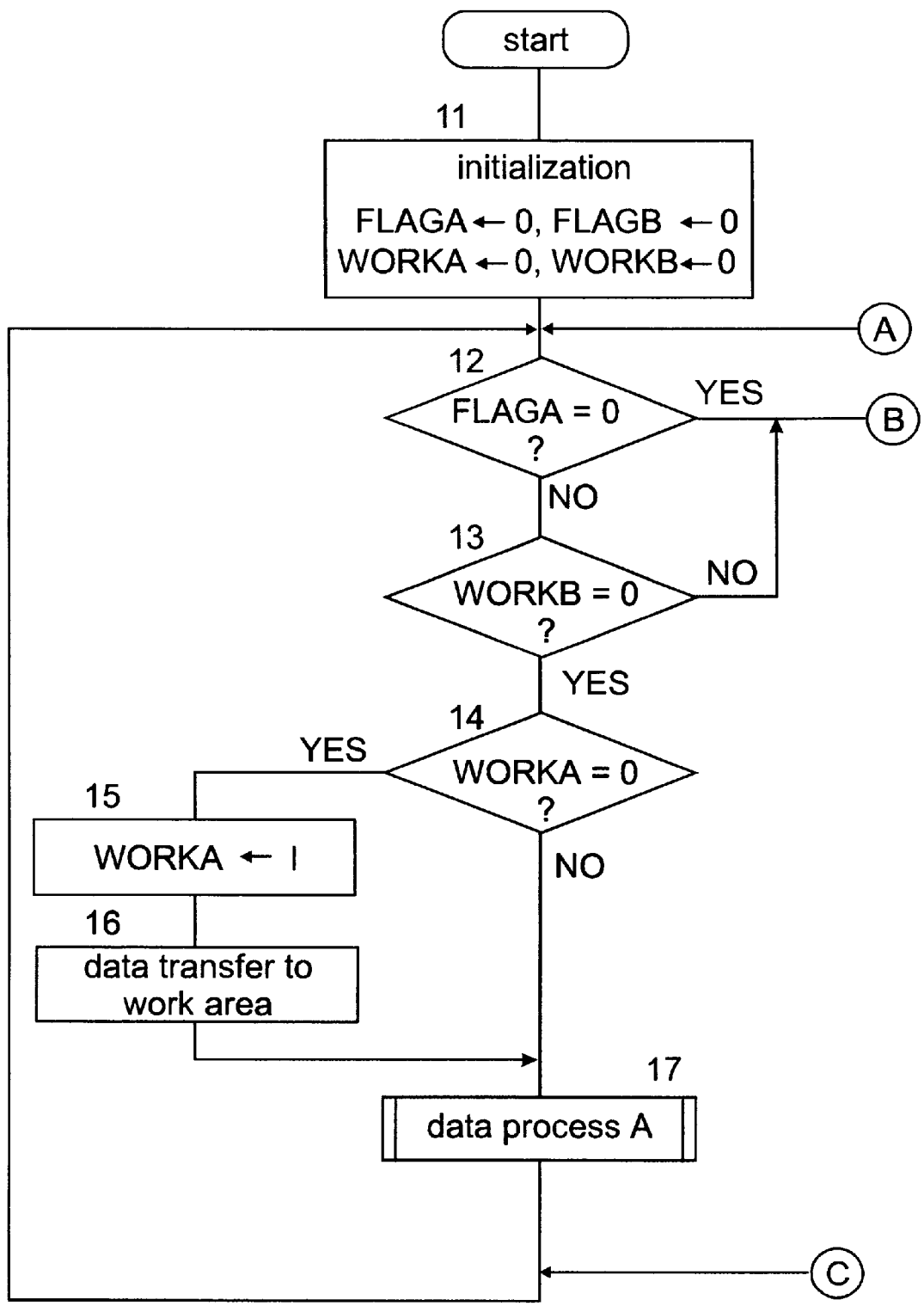
FIGS. 1a and 1b are a main flow chart showing all operations of a first embodiment of the present invention.
Figure 1B:
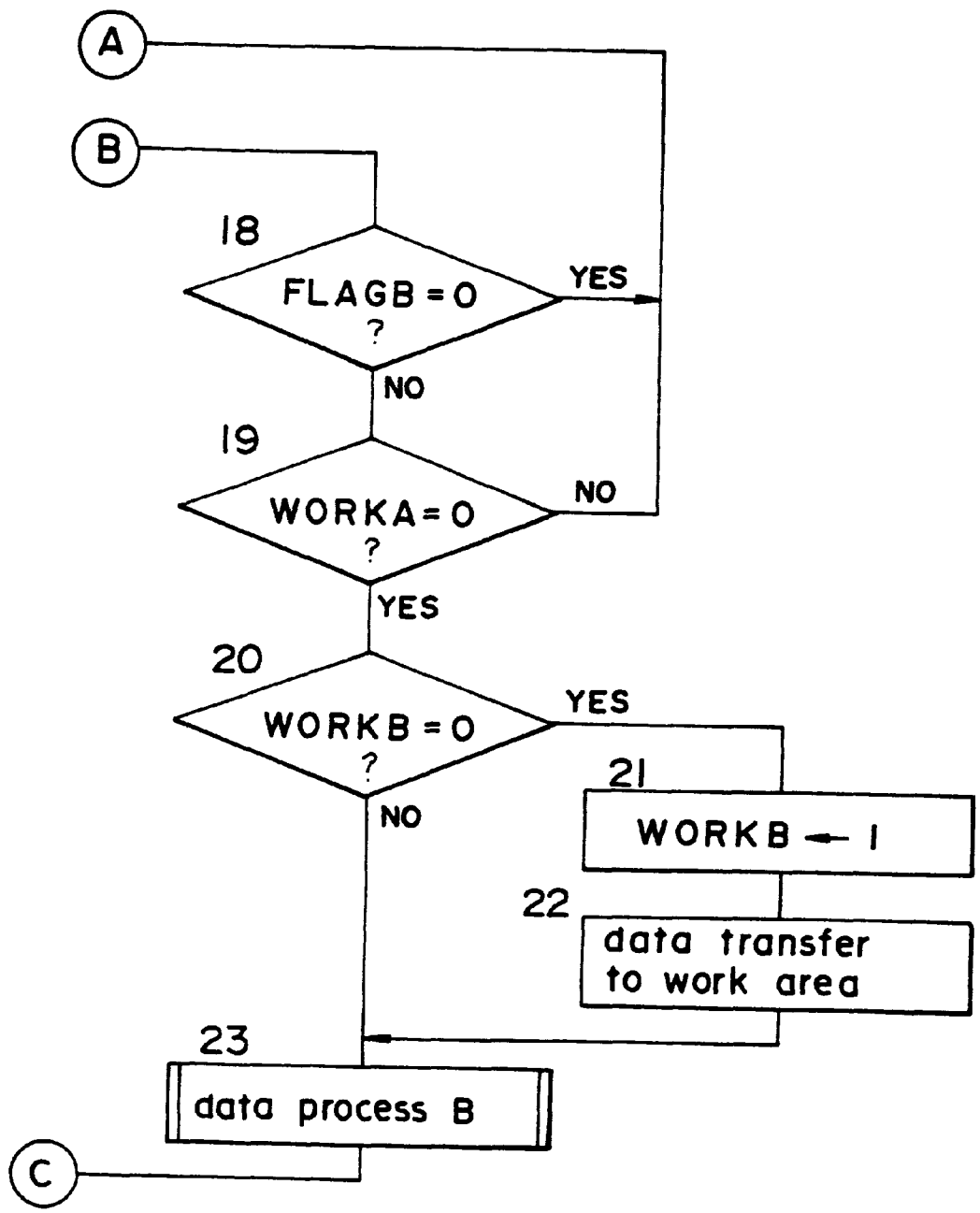

FIGS. 1a and 1b are a flow chart showing the operation of the CPU 11.

When the power unit is turned on, each portion is initialized based on the switch state read through the ROM 12 data and the dip switch interface 17 (step 11). At this time, the flags FLAGA, FLAGB, WORKA and WORKB are all set at [0].

The flags FLAGA, and FLAGB respectively indicate the existence of data in the receiving buffer areas E3A and E3B. In the receiving process described later the aforesaid flags FLAGA and FLAGB are set at [1] when data have been stored in the receiving buffer areas E3A and E3B. The flags WORKA and WORKB indicate whether or not image writing is currently executing (on-going dot data development) in the bit map area 4. The flag WORKA corresponds to the interface 14A, and the flag WORKB corresponds to the interface 14B.

Next, in step #12, the flag FLAGA is checked to determine the existence of data in receiving buffer area E3A. If the flag FLAGA is set at [0], the flag FLAGB is checked in step #18 to determine the existence of data in the receiving buffer area E3B. If the flag FLAGB is also found to be set at [0], the routine returns to step #12 and the process of steps #12 and #18 are repeated. That is, the entry of the print data DA and DB transmitted from the host 2A or 2B and the storage of said data in the receiving buffer areas E3A or E3B is awaited.

If the flag FLAGA is found to be set at [1] in step #12, the flag WORKB is checked in step #13. When the flag WORKB is found to be set at [1] in step #13, one-page image information corresponding to the print request transmitted from the host 2B is currently being written to the bit map area E4, so that the routine moves to step #18 and the aforesaid writing continues.

If the flag WORKB is found to be set at [0] in step #13, then the routine continues to step #14 where the flag WORKA is checked. If the flag WORKA is set at [1] in step #14, then the data process A corresponding to the priority interface 14A is executed in step #17.

If the flag WORKA is found to be set at [0] in step #14, said flag WORKA is set at [1] in step #15 because data development in bit map area E4 is renewed, or data development of the next page information is started, and the data of the backup area E2A is transferred to the work area E1 in step #16. Next, the data process A is executed in step #17, and the routine returns to step #12 thereafter.

On the other hand, when the flag FLAGB is found to be set at [1] in step #18, the flag WORKA is checked in step #19 to determine whether or not it is set at [0]. If the flag WORKA is found to be set at [0] in step #19, the flag WORKB is checked in step #20 to determine whether or not it is set at [0]. Then, if the flag WORKB is found to be set at [1] in step #20, the data process B corresponding to the interface 14B is executed in step #23.

When the flag WORKB is found to be set at [0] in step #20, it is reset at [1] in step #21, and the data of the backup area E3B is transferred to the work area E1 in step #22. Then, the data process B is executed in step #23, and the routine thereafter returns to step #12.

Figure 2:
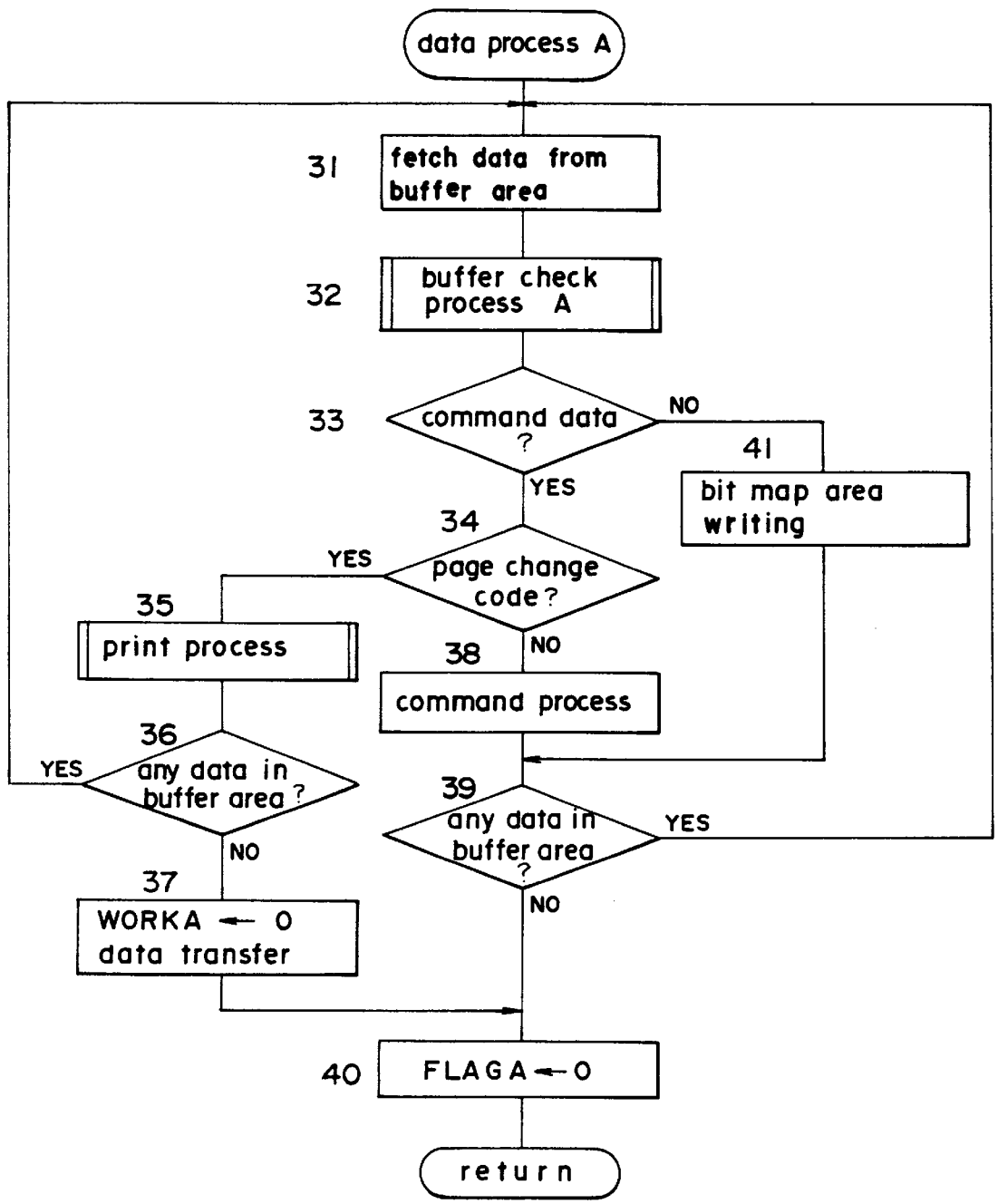

FIG. 2 is a flow chart for the data process A of step #17 shown in FIG. 1a.

In FIG. 2, first, data of a specified length (for example, 1 byte) are fetched from the receiving buffer area E3A (step #31).

Figure 3:
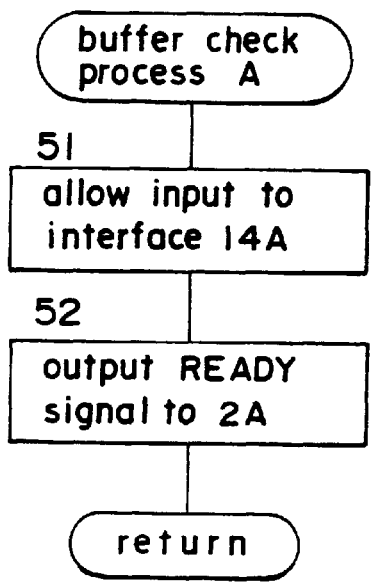
FIG. 3 is a flow chart showing a buffer check process A shown in FIG. 2.

Since an empty area is created in the receiving buffer area E3A when the aforesaid data are fetched, the routine of this process continues and a buffer checking process A is executed in step #32. More specifically, as shown in FIG. 3, input of print data DA to the interface 14A is enabled (step #51), and a ready signal (command data) is output to designate the ready state whereby the laser printer 1 can receive data from the host 2A (step #52). The process in step #51 cancels the input inhibited state occurring when no empty areas remain in the receiving backup area E3A (FULL state). When the interface 14A is a centronics model, the status of the laser printer 1 as being capable of reception in the ready state can be discriminated by the host 2A state without specifically requiring the output of a ready signal.

Referring again to FIG. 2, a check is made in step #33 to determine whether or not the data fetched from the receiving buffer area E3A is command data.

If, in step #33, the fetched data are not found to be command data, i.e., the fetched data are image data, then the image data are written to the bit map area E4 in step #41. At this time, when the image data to be written are character codes, the fonts stored in the work area E1 are selected, and the characters corresponding to these character codes are developed as bit data in the bit map area E4 in accordance with the aforesaid selected fonts.

Then, in step #39, a check is made to determine the existence of data in the receiving buffer area E3A, and if data are present the routine returns to step #31. If data are not present, the flag FLAGA is reset at [0] in step #40.

On the other hand, when the data fetched in step #33 are determined to be command data and said command data are found in step #34 to be page change codes expressing the page break of each page, the printing process is executed in step #35 wherein data are read from the bit map area E4, data are transmitted to the print engine 20 and the like.

If no subsequent data are found in the receiving buffer area E3A in step #36, the flag WORKA is reset at [0] in step #37 to end the printing process, and the data are transferred from the work area E1 to the backup area E2A. When subsequent data are found in the receiving buffer area E3A in step #36, the routine returns to step #31 and the next page printing process is executed.

When the data fetched from the receiving buffer area E3A in step #34 are found to be command data other than the aforesaid page feed codes, the command processes are executed in step #38 in accordance with said command data.

Figure 4:
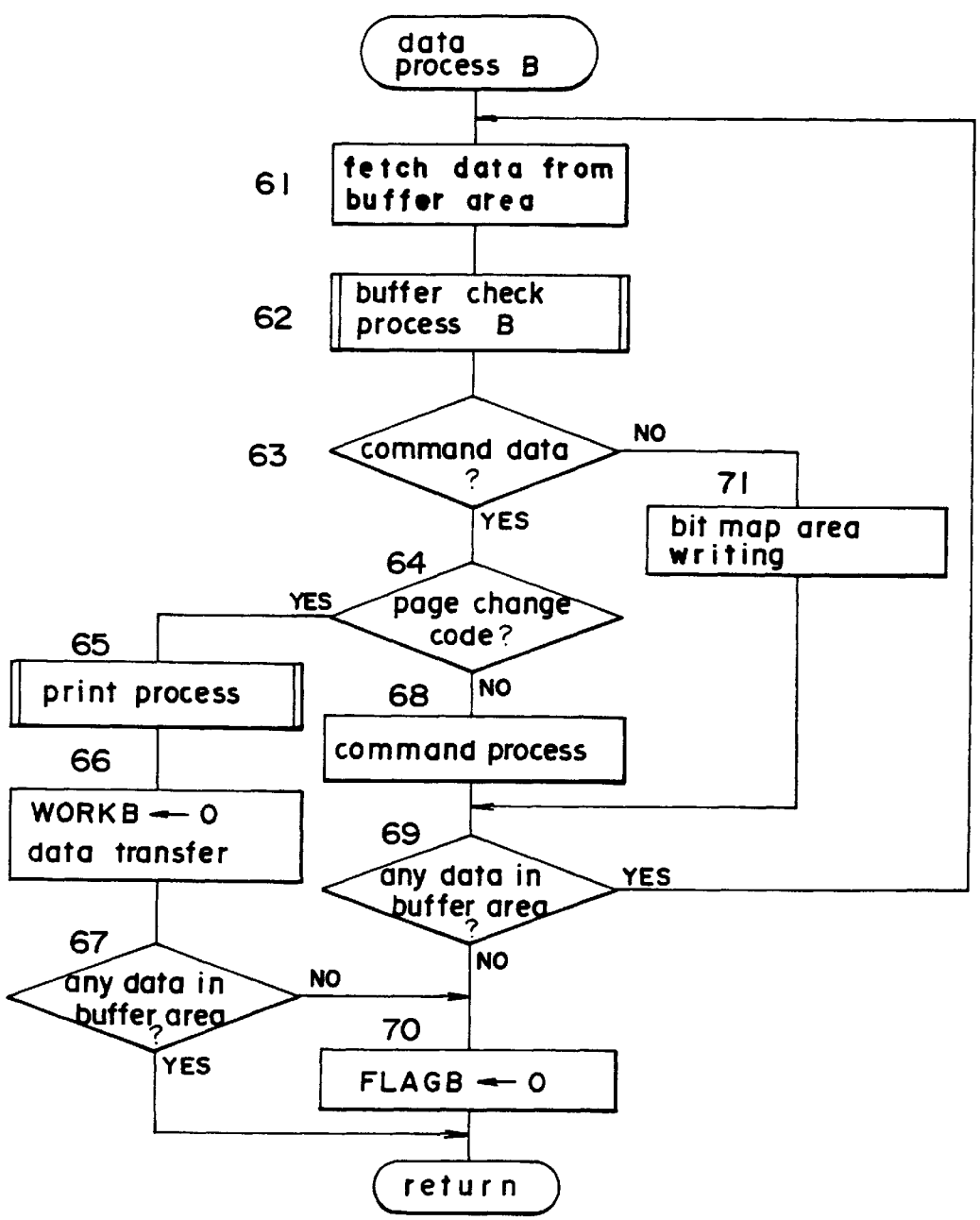
FIG. 4 is a flow chart showing a data process B of FIG. 1b.

FIG. 4 is a flow chart of the data process B of FIG. 1b.

In the data process B, virtually the same process as the previously described data process A is executed for the data of the receiving buffer area E3B.

Figure 5:
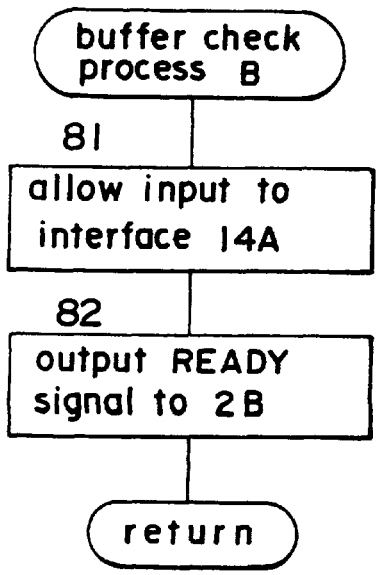
FIG. 5 is a flow chart showing the buffer check B of FIG. 4.

In other words, after the data are fetched from the receiving buffer area E3B, the backup process B shown in FIG. 5 is executed (steps #61 and #62). Then, a printing process, command process, and writing of the data of bit map area E4 are executed (steps #63, 64, 65, 68 and 71) in accordance with the various data types.

In the data process B, after the printing process has been executed in step #65, the flag WORKB is reset at [0] as the print completion process in step #66 without regard to the existence or absence of data in the receiving buffer area E3B, and finally the data transfer from the work area E1 to the backup area E2B is executed. In other words, the process is temporarily halted every time a one-page segment printing process is completed even when other page segment data remain in the receiving buffer area E3B, then the program returns to the main routine.

Thus, in the laser printer 1, when the print data DA are input from the host 2A during the execution of the printing process for the host 2B, i.e., the writing of the bit map area E4 based on the print data DB, and data output to the print engine 20, the printing process for the executing host 2B is paused after each page break, or alternatively, the printing process for the host 2A is given priority in execution. Thereafter, when the printing process for the host 2A is completed, and the pause printing process for the host 2B is restarted.

Figure 6:
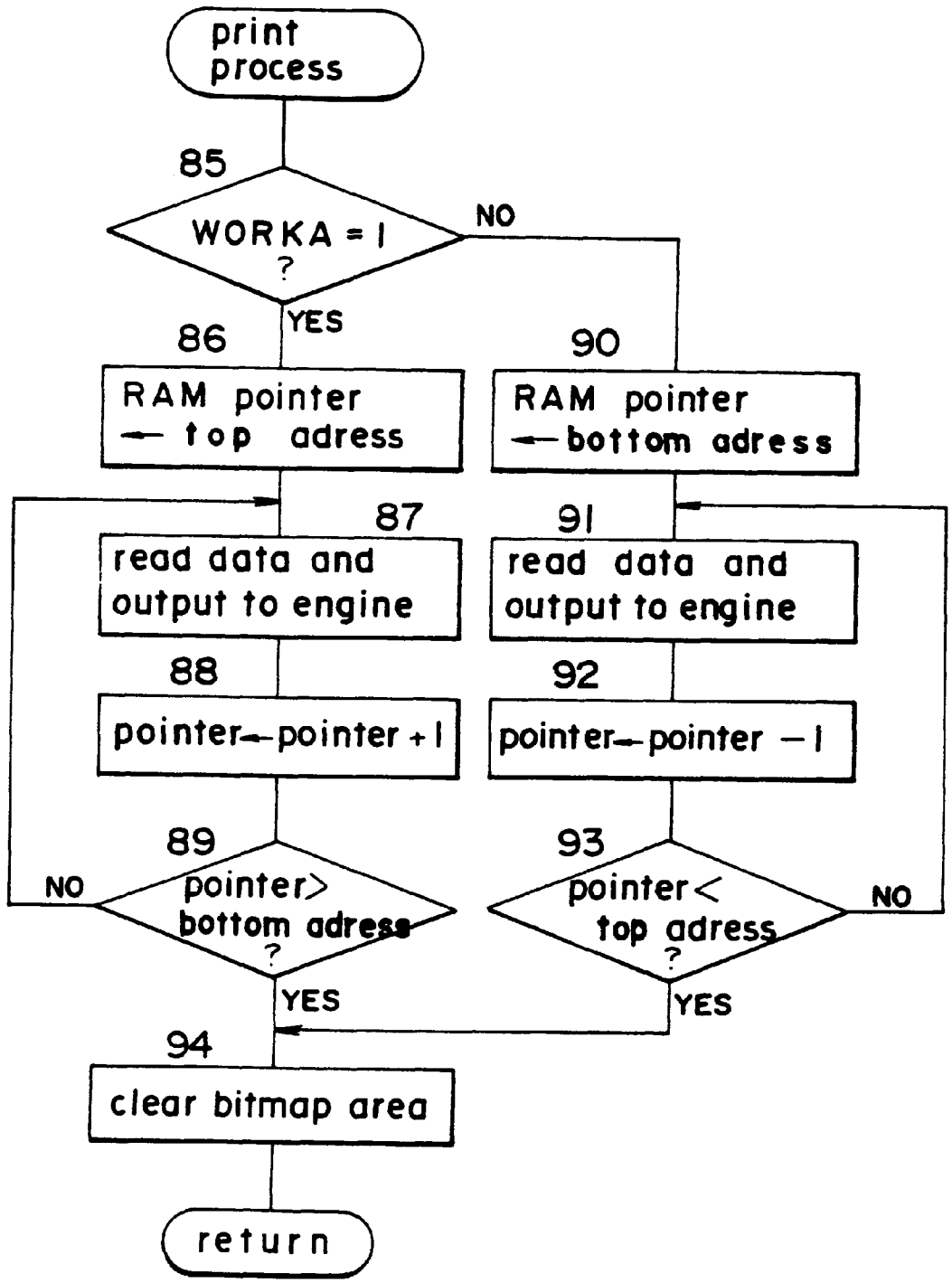
FIG. 6 is a flow chart showing the printing process of FIGS. 2 and 4.

FIG. 6 is a flow chart of the printing processes of FIGS. 2 and 4.

In FIG. 6, the initial check of the flag WORKA is made to determine whether or not the flag is set at [1].

When the flag WORKA is set at [1], printing is executed for the host 2A. In this case, the top address of the bit map area E4 is set by a pointer indicating the address in RAM 13 (step #86).

Then, the pointer address data are read from the bit map area E4 and transmitted to the print engine 20, whereupon the pointer is incremented. The aforesaid process is repeated until the bottom address of the bit map area E4 is reached (steps #87, 88 and 89). The bit map area E4 is cleared when the reading of the data from all parts of the bit map area E4 has been completed (step #94). The reading of the bit map area E4 is accomplished according to the synchronization signals transmitted from the print engine 20 and in correspondence with the margin values stored in the work area E1. In parallel with the aforesaid process, the photosensitive member in the print engine 20 is exposed to flashing light from a laser light source.

On the other hand, when the flag WORKA is set at [0] and printing is executed for the host 2B, the bottom address of the bit map area E4 is set by the pointer indicating the address in RAM 13 (step #90).

Then, the pointer address data are read from the bit map area E4 and transmitted to the print engine 20, whereupon the pointer is decremented. The aforesaid process is repeated until the top address of the bit map area E4 is reached (steps #91, 92 and 93). The bit map area E4 is cleared when the reading of the data from all parts of the bit map area E4 has been completed (step #94).

That is, when printing for the host 2A, the data are read in the same sequence as the writing sequence from the top address to the bottom address of the bit map area E4. In contrast, the data of the bit map area E4 is read in the reverse to the writing sequence when printing for the host 2B.

Figure 11A:
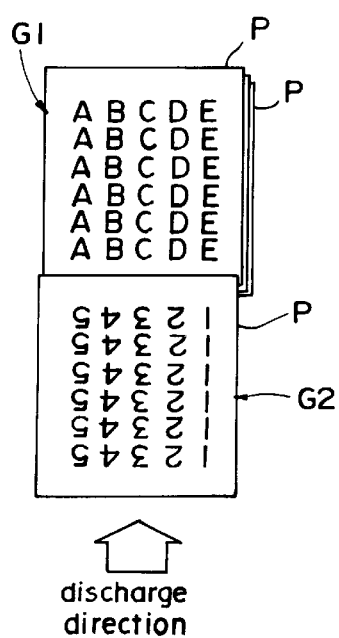
FIG. 11 is an illustration showing the condition of the discharged sheets.
Figure 11B:
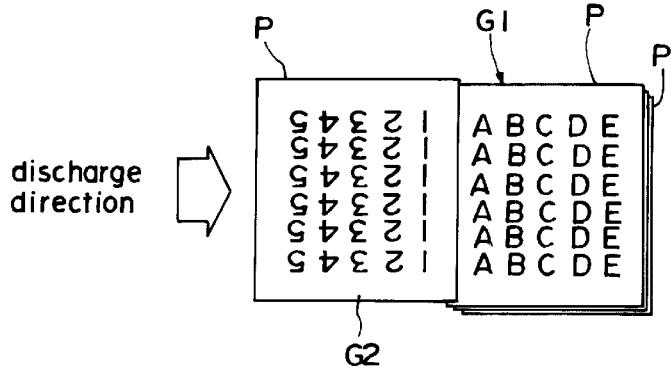

Accordingly, as shown in FIG. 11, in the laser printer 1 the orientation of the image G1 comprising the letters "A, B, C, D, E" from the host 2A, and the orientation of the image G2 comprising the numbers "1, 2, 3, 4, 5" from the host 2B are mutually rotated 180° relative to the paper discharge direction (indicated by arrows in the drawing). That is, because the images G1 and G2 are inverted in one orientation and an opposite orientation such that sheets P can be sorted by those corresponding to the host 2A and those corresponding to the host 2B by means of the directional orientations of the images G1 and G2 even when the discharged sheets P are stacked. FIG. 11a shows an example wherein the orientations of the images G1 and G2 coincide with the discharge direction of the sheets P, whereas FIG. 11b shows an example wherein the orientations of the images G1 and G2 are perpendicular to the discharge direction of the sheets P.

Figure 7A:
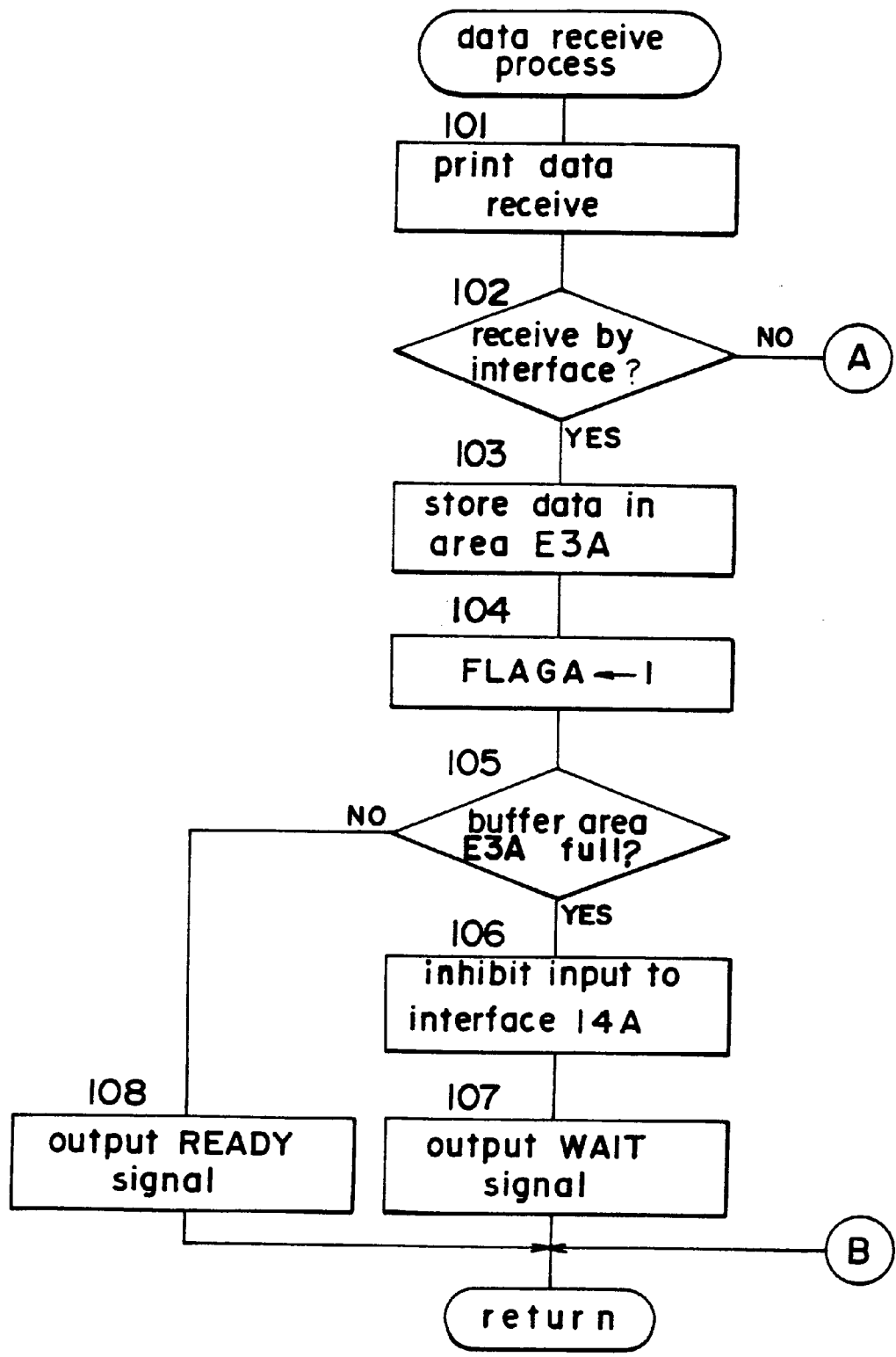
FIGS. 7a and 7b are a flow chart showing the receiving process of the first embodiment of the invention.
Figure 7B:
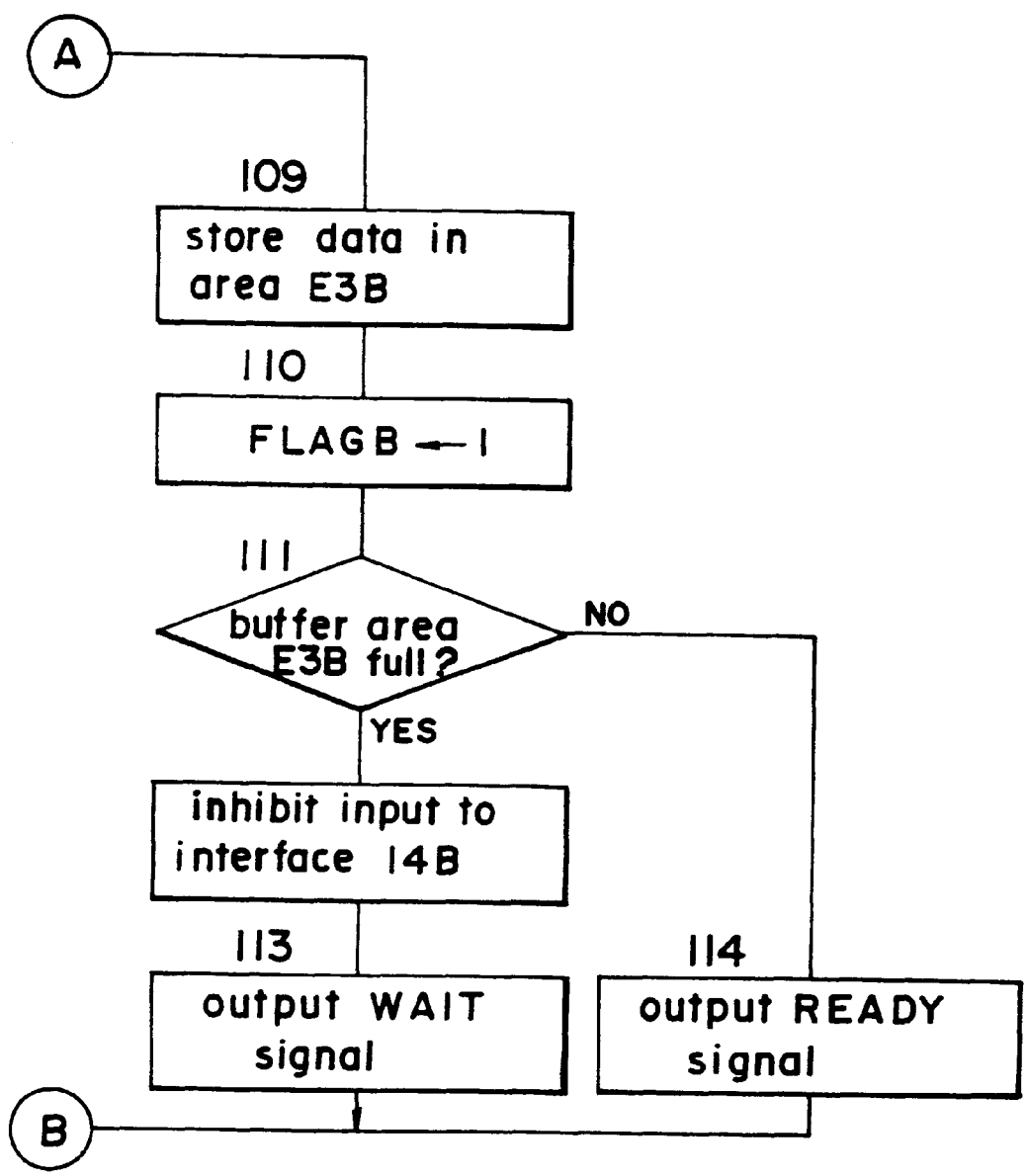

FIGS. 7a and 7b are a flow chart of the receiving process.

The main routine of the receiving process is executed whenever required as the pause routine of the main routine of FIG. 1 in correspondence with the input of print data DA and DB to the interfaces 14A and 14B.

When print data is received and a pause process is requested by the interrupt controller 16 in step #101, the CPU 11 checks to determine whether the reception is from the interface 14A or 14B in step #102. If the reception is found to be from the interface 14A in step #102, then the print data DA are stored in the receiving buffer area E3A in step #103, and the flag FLAGA is set to [1] in step #104.

Next, the receiving buffer area E3A is checked in step #105 to determine whether or not it is full. If the buffer area is not full, a ready signal is output to the host 2A in step #108, whereas if the buffer area E3A is full in step #105, input is inhibited to the interface 14A in step #106. A wait signal is output in step #107 to alert the host 2A to the full buffer condition.

On the other hand, if the reception is determined to be from the host 2B in step #102, the print data DB are stored in the receiving buffer area E3B in step #109, and the flag FLAGB is set at [1] in step #110.

When the receiving buffer area E3B is not found to be full in step #111, a ready signal is output to the host 2B, whereas when the buffer area E3B is full in step #111, output to the interface 14B is inhibited in step #112, and a wait signal is output to the host 2B in step #113.

Figure 12:
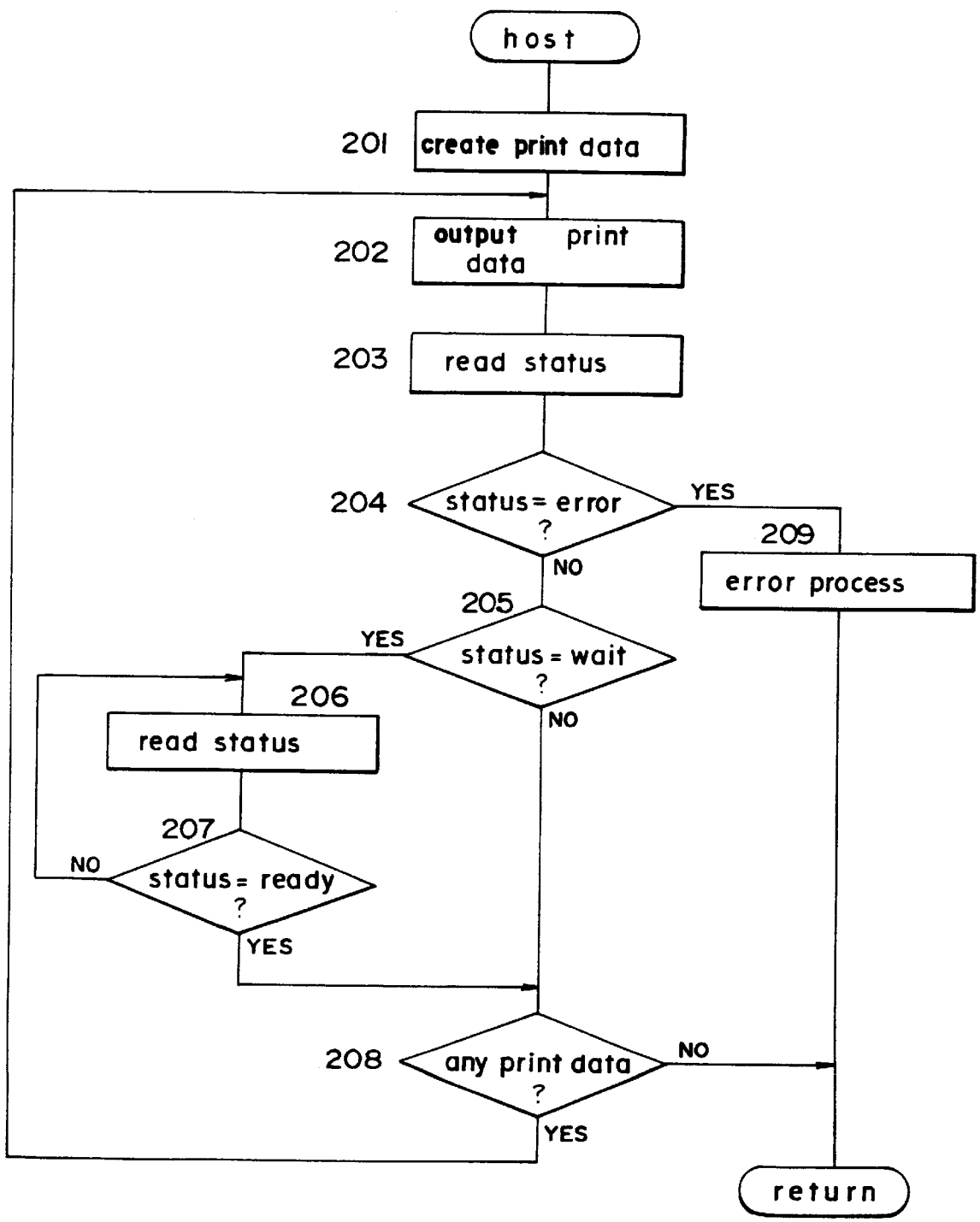
FIG. 12 is a flow chart briefly showing the host operations.

FIG. 12 is a flow chart showing the operations of the hosts 2A and 2B.

After the print data DA and DB are created in step #201, said print data DA and DB having a specified length are output to the laser printer 1 in step #202, i.e., a print request is issued.

Subsequently, the status of the laser printer 1 is read in step #203, and if an error state exists wherein the status indicates a reception abnormality in step #204, then an error process corresponding to the type of error is executed in step #209. If the status does not indicate an error state in step #204, then a wait state obtains in step #205, and the status of the laser printer 1 is read again in step #206, and the ready state is awaited in step #207.

When the status of the laser printer 1 indicates a ready state, the existence of print data DA and DB for transmission is checked in step #208. If data exists, the routine returns to step #202 and the next data are transmitted.

A second embodiment of the present invention is described below.

In the first embodiment, priority was assigned to the interface 14A over the interface 14B by means of dip switches. Accordingly, when print data were input to the priority interface 14A and a print request issued during an on-going printing process for the interface 14B, the printing process for the interface 14B is temporarily paused and the printing process of the interface 14A is executed as an interrupt process. When print data are input to the interface 14B, which does not have priority, and a print request is issued during an on-going printing process for the interface 14A, the printing process for the interface 14B is not executed as an interrupt process.

Conversely, in the second embodiment, when print data are input to the non-priority interface 14B and a print request is issued during an on-going printing process for the priority interface 14A, the printing process for the interface 14B is executed as an interrupt process in accordance with the specified printing conditions (copy number and the like). Furthermore, the parameters for the reference values for allowing a pause in the printing process can be suitable selected.

It is clear for the preceding description that the second embodiment of the invention provides a function allowing an interrupt process in the printing process for a non-priority interface in accordance with the specified printing conditions in the printing system PS of the first embodiment. Accordingly, the second embodiment is identical to the first embodiment except for the steps relating to the number of remaining sheets to be printed (the number of sheets specified at the start of the printing process) in the printing process of the hosts 2A and 2B, i.e., the CPU operations (FIG. 1), data process A (FIG. 2), data process B (FIG. 4), receiving process (FIGS. 7a and 7b), and host process (FIG. 12). The CPU operations (FIGS. 13a and 13b), data process A (FIG. 14), data process B (FIG. 15), receiving process (FIGS. 16a and 16b) and host process (FIG. 17) of the second embodiment are described using only the pertinent flow charts.

Figure 13B:
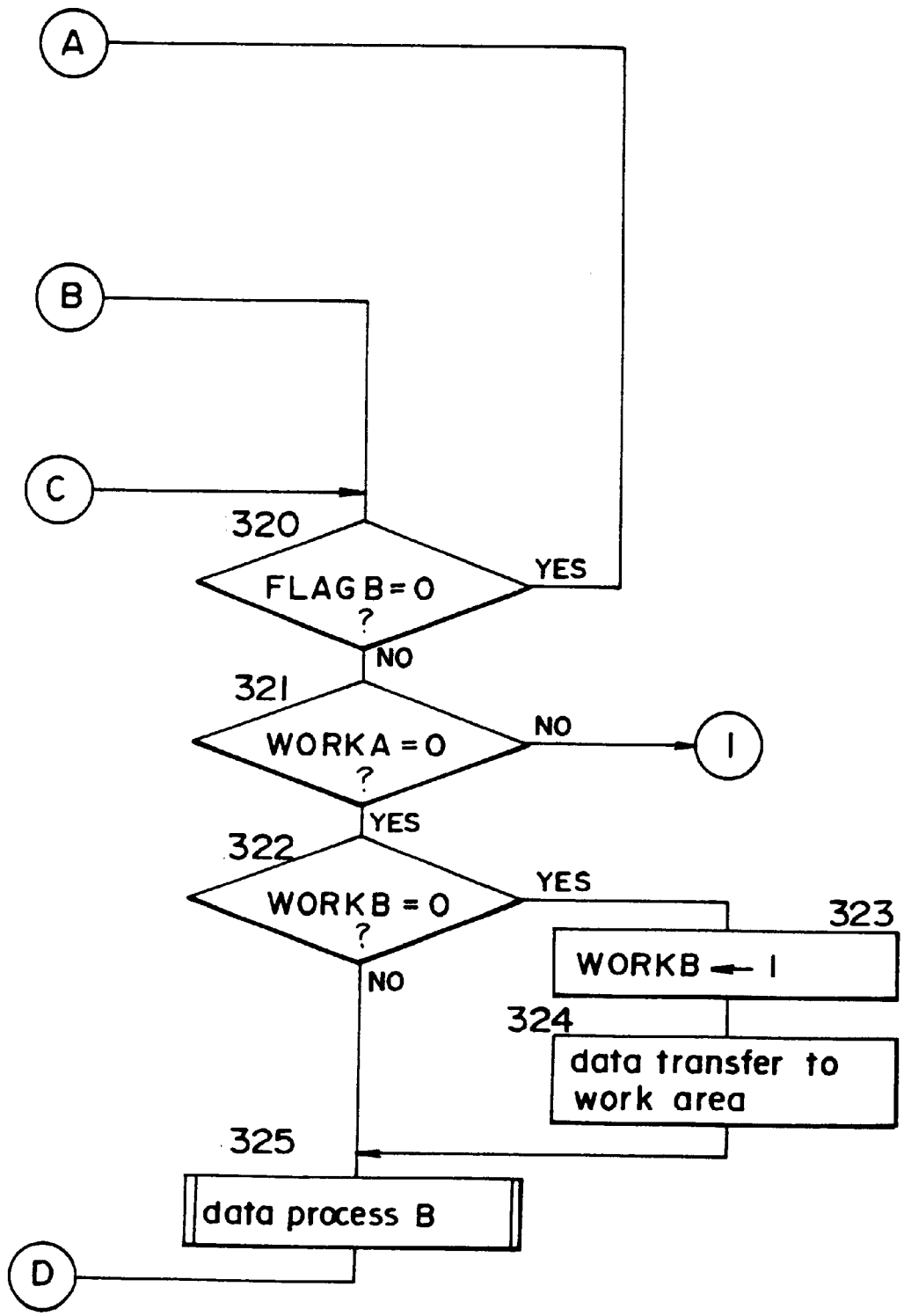

FIGS. 13a and 13b are a main flow chart showing the operation of the CPU 11.

When power is first turned on, each portion of the system is initialized based on the data in ROM 12 and the switch states read through the dip switch interface 17 (step #311). At this time, the flags FLAGA, FLAGB, WORKA, WORKB, and the counters CNTA and CNTB are reset at [0], and the value of the parameter PARA is set at, for example, [10].

The flags FLAGA and FLAGB respectively indicate the presence or absence of data in the receiving buffer areas E3A and E3B. These flags are set at [1] when data are stored in the receiving buffer areas E3A and E3B in a receiving process described later. The flags WORKA and WORKB indicate whether or not an image is being written (currently on-going dot data development) to the bit map area E4. The flag WORKA corresponds to the interface 14A, and the flag WORKB corresponds to the interface 14B.

The counters CNTA and CNTB indicate the number of remaining copies to be printed (number of copies specified at the start of printing). The counter CNTA corresponds to the interface 14A, and the counter CNTB corresponds to the interface 14B.

Next, the counter CNTB is checked (step #312). When the counter CNTB is set at [0], the routine moves to step #314.

If the counter CNTB is not set at [0], a check is made to determine whether or not the following equation (1) is satisfied (step #313):

$$CNTA > CNTB + PARA \quad (1)$$

where CNTA and CNTB are the values for the counters CNTA and CNTB, and PARA is the value of the parameter PARA; the value of the parameter PARA is "10" at this time.

For example, when a print request for 10 pages is issued by the host 2B while printing wherein the number of remaining sheets to be printed is 20 is executed via a print request from the host 2A, the values are CNTA=20 and CNTB+PARA=13 so that the equation (1) is satisfied. In this case, the print request of the host 2B is executed and the routine moves to step #320. However, when a print request for 10 pages is issued by the host 2B, the values are CNTA=20 and CNTB+PARA=20 so that the equation (1) is not satisfied. In this instance, the printing via the request of the host 2A continues execution, and the routine moves to step #314.

That is, basically, when a different print request is issued after execution of a first printing process has begun, the latter print request is executed first if the number of sheets to be printed are fewer than the remaining sheets to be printed in the on-going printing process. In the laser printer 1, when the host 2B issues a secondary print request, the difference between the specified number of sheets by the host 2B and the remaining sheets in the on-going printing process must be greater than the value of the parameter PARA as shown in equation (1). Accordingly, the host 2A is given priority over the host 2B.

In step #314, the flag FLAGA is checked for the existence of data in receiving buffer area E3A. If the flag FLAGA is set at [0], the routine continues to step #320 where the flag FLAGB is checked for the existence of data in the receiving buffer area E3B. If the flag FLAGB is found to be set at [0] in step #320, the routine returns to step #312, i.e., the storage of the print data DA or DB from the hosts 2A or 2B in the receiving buffer areas E3A or E3B is awaited.

If the flag FLAGA is set at [1] in step #314, the flag WORKB is checked in step #315. If the flag WORKB is found to be set at [1] in step #315, the routine moves to step #320 because a one-page segment image corresponding to the print request from the host 2B is being written to the bit map area E4, and the writing process continues uninterrupted.

When the flag WORKB is found to be set at [0] in step #315, the routine continues to step #316 where the flag WORKA is checked. If the flag WORKA is set at [1] in step #316, then the data process A for the priority interface 14A is executed.

If the flag WORKA is found to be set at [0] in step #316, the flag WORKA is reset at [1] in step #317 because data development to the bit map area E4 is started anew, or the data development of the next page segment is started. Then, the data of the backup area E2A is transferred to the work area E1 in step #318. After the data process A has been executed in step #319, the routine returns to step #312.

On the other hand, when the flag FLAGB is found to be set at [1] in the aforementioned step #320, the flag WORKA is checked in step #321. If the flag WORKA is found to be set at [0] in step #321, the flag WORKB is checked in step #322. When the flag WORKB is set at [1] in step #322, the data process B for the interface 14B is executed in step #325.

Furthermore, if the flag WORKB is found to be set at [0] in step #322, it is reset at [1] in step #323, and the data in backup area E3B is transferred to the work area E1 in step #324. After the data process B has been executed in step #325, the routine returns to step #312.

FIGS. 14a and 14b are a flow chart of the data process A of step #319 in FIG. 13a.

Figure 14:
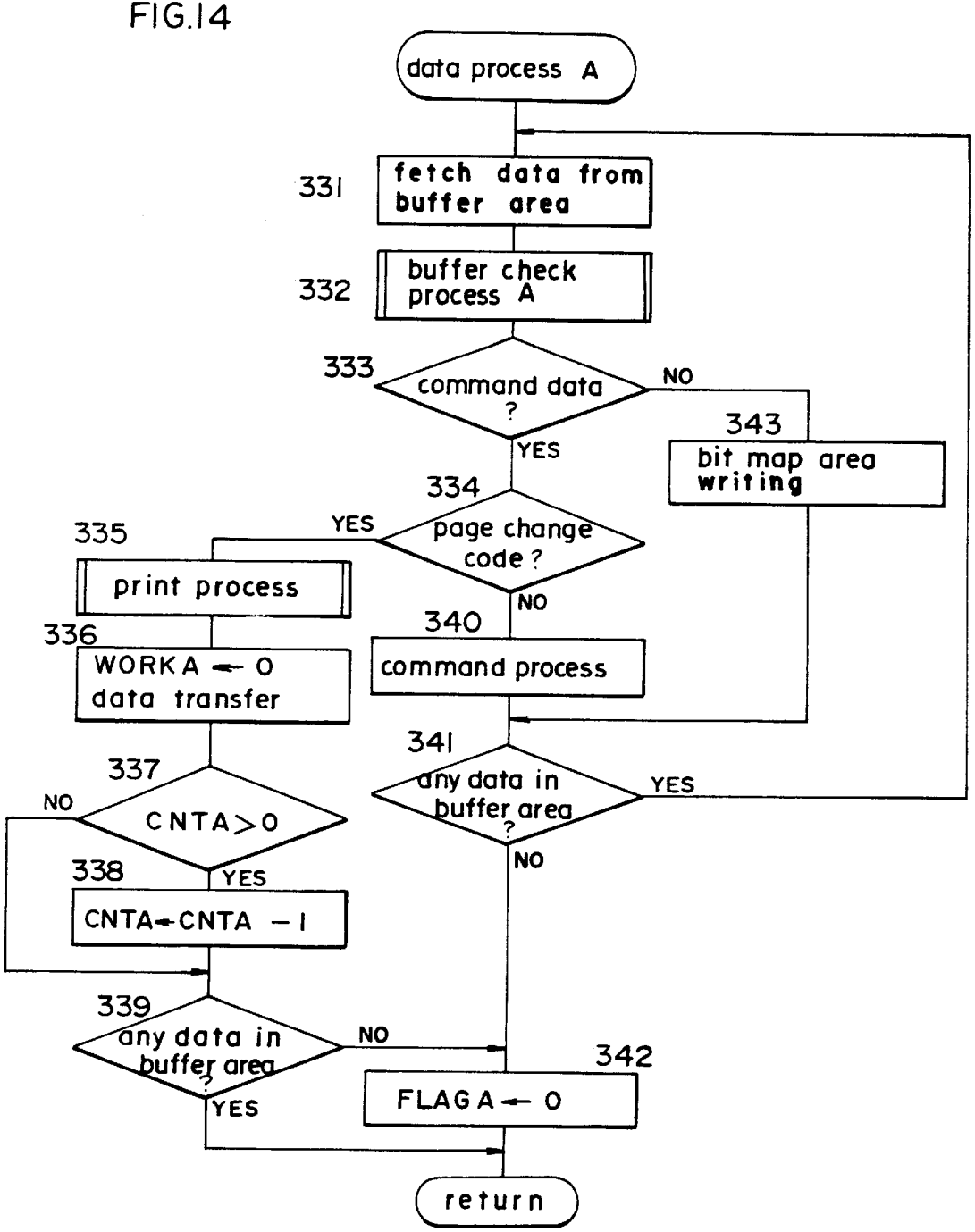

In FIG. 14, first, data of a specified length (for example, 1 byte) are fetched from the receiving buffer area E3A (step #331).

Empty areas are created in the receiving buffer area E3A due to the fetching of data therefrom in step #331. Processing of these empty areas is accomplished by the buffer check process A in step #332. The buffer check process A of the present embodiment is identical to that described in the first embodiment (refer to FIG. 3) and is, therefore, omitted herefrom.

Refer again to FIG. 14. In step #333, the data fetched from the receiving buffer area E3A are checked to determine whether or not said data are command data.

If the fetched data are not command data, i.e., if the fetched data are image data, said image data are written to the bit map area E4 (step #343). At this time, if the image data to be written are character codes, fonts stored in the work area E1 are selected, and the characters relating to the character codes are developed as bit data in the bit map area E4 in accordance with the selected fonts.

Then, the receiving buffer area E3A is checked for the presence of data in step #341. If data are present, the routine returns to step #331, whereas if data are absent, the flag FLAGA is reset at [0] in step #342.

On the other hand, if the data fetched in step #333 are found to be command data, said command data are found to be page change codes indicating page breaks for each page in step #334, and print processes such as reading the data from the bit map area E4 and data transference to the print engine 20 and the like are executed in step 335. Subsequently, in step #336, the flag WORKA is set at [0] as the print completion process, and the data are transferred from the work area E1 to the backup area E2A.

If the counter CNTA is not found to be set at [0] in step #337, said counter CNTA is decremented in step #338. If the next data in the receiving buffer area E3A is found to be absent in step #339, the routine continues to step #342 previously described.

When the data fetched from the receiving buffer area E3A are found to be command data other than page change codes in step #334, the command processes are executed in accordance with the command data in step #340.

Figure 15:
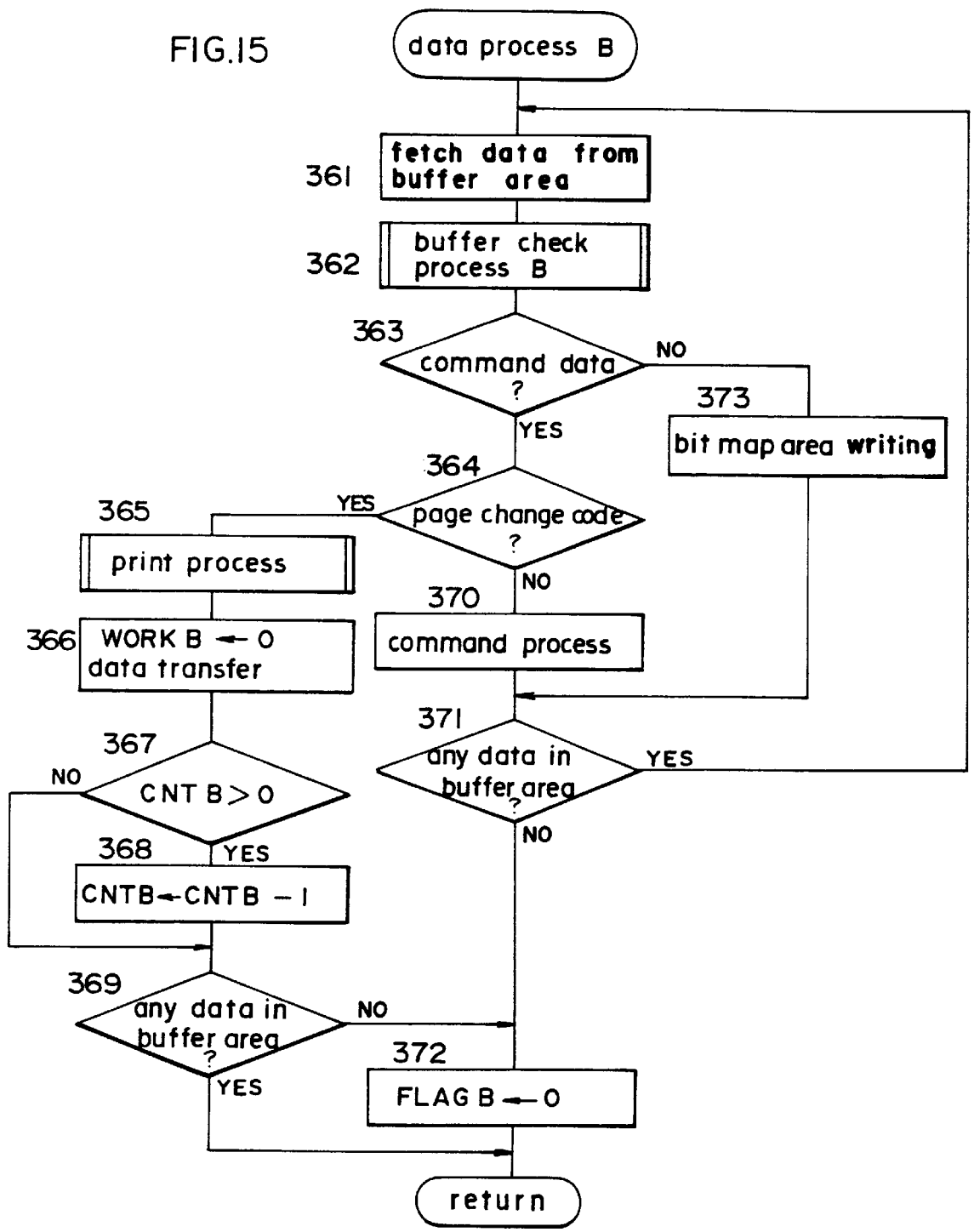
FIG. 15 is a flow chart showing a data process B of FIG. 13b.

FIG. 15 is a flow chart of the data process B in FIG. 13b.

The data process B is executed in the same way as the previously described data process A except the data in the receiving buffer area E3B are the objects of processing.

That is, after the data are fetched from the receiving buffer area E3B in step #361, the buffer check process B is executed in step #362. Since the buffer check process B of the present embodiment is identical to the process described for the first embodiment (refer to FIG. 5), a further description is omitted herefrom. Then, a printing process, command process, and writing of the data of bit map area E4 are executed (steps #365, 370, and 373) in accordance with the various data types, in the same way as in the data process A shown in FIG. 14 (steps #363 and 364).

After the print process in step #365 is completed, the flag WORKB is reset at [0], the data are transferred from the work area E1 to the backup area E2B, the counter CNTB is checked and decremented, then the receiving buffer area E3B is checked (steps #366 to 369). Furthermore, after the command process in step #370, or writing to the bit map area E4 in step #373, the receiving buffer area E3B is checked and the flag FLAGB is reset at [1] (steps #371 and 372).

Figure 16A:
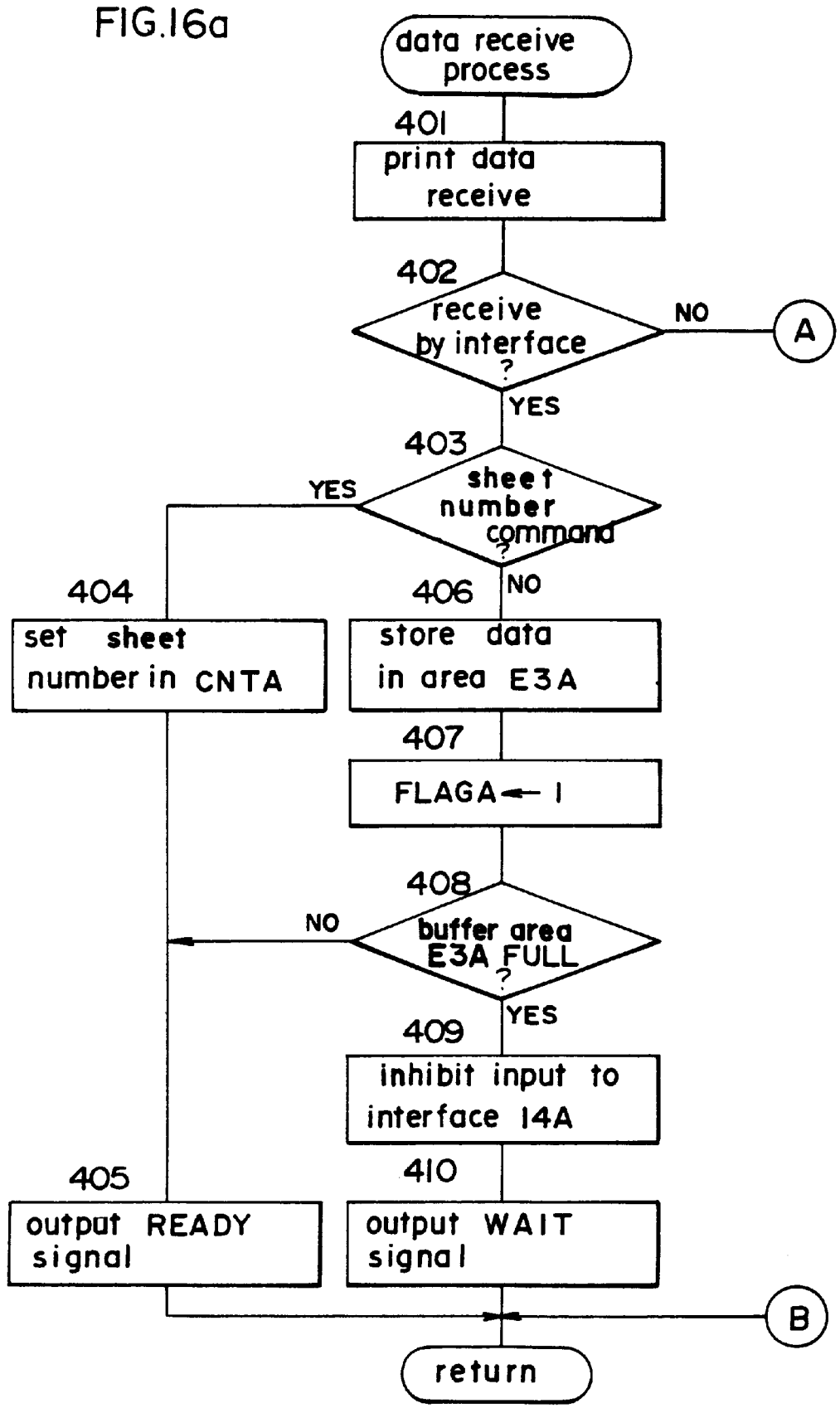
FIGS. 16a and 16b are a flow chart showing the receiving process of the second embodiment of the invention.
Figure 16:
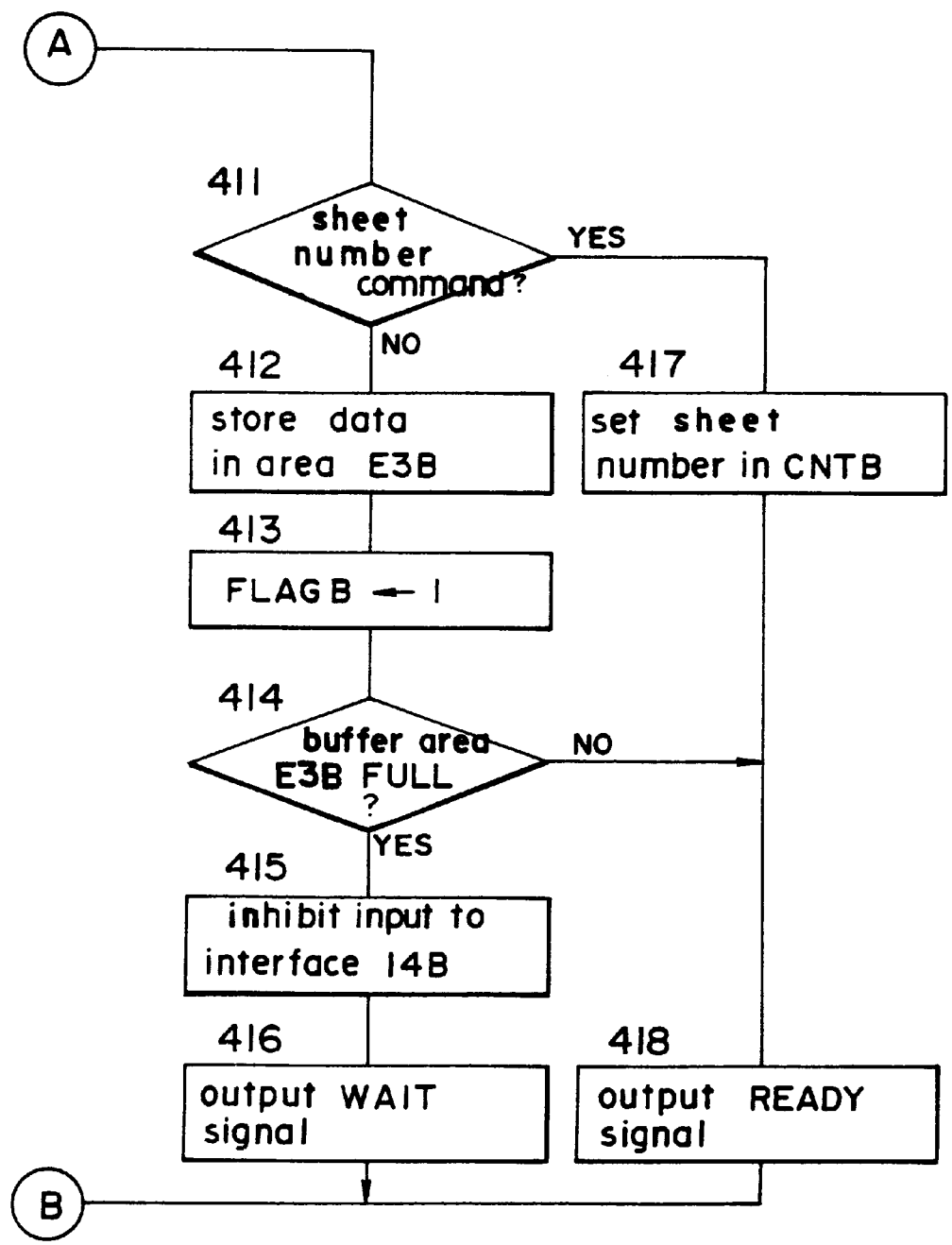

FIGS. 16a and 16b are a flow chart of the receiving process of the second embodiment.

When an interrupt process is requested by the interrupt controller 16, the CPU 11 checks for signals from either the interface 14A or 14B (steps #401 and 402). If signals from the interface 14A are found in step #402, and if data received by the interface 14A are the sheet number commands specifying the number of copies to be printed, then the specified number is set in the counter CNTA in accordance with the sheet number command specifying the number of copies to be printed in step #404.

If the data received from the interface 14A is data other than sheet number commands, said data are stored in the receiving buffer area E3A in step #406, and the flag FLAGA is set at [1] in step #407.

Next, a check is made in step #408 to determine whether or not the receiving buffer area E3A is full. If the buffer area E3A is not full, a ready signal is output to the host 2A in step #405. If the buffer area E3A is found to be full in step #408, the input of data to the interface 14A is inhibited in step #409, and a wait signal is output in step #410 to alert the host 2A that data input to the interface 14A is inhibited.

On the other hand, when reception from the interface 14B is determined in step #402, and when the received data is found to be sheet number commands in step #411, the specified number of copies is set in the counter CNTB in accordance with the sheet number commands in step #417. If the data received by the interface 14B are data other than the sheet number commands, said data are stored in the receiving buffer area E3B in step #412, and the flag FLAGB is set at [1] in step #413.

If the receiving buffer area E3B is not full in step #414, a ready signal is output to the host 2B in step #418. If the receiving buffer area E3B is full in step #414, however, a wait signal is output to the host 2A in step #416, after further input to the interface 14A is inhibited in step #415.

FIG. 17 is a flow chart showing the operations of the hosts 2A and 2B.

After the creation of print data DA and DB, the sheet number commands are output to the laser printer 1 (steps #501 and 502). Then, the status of the laser printer 1 is read in step #503. If the read status is found to be an error state indicating a reception abnormality in step #504, an error process is executed in step #505.

If no error state is found in step #504, the print data DA and DB of a specified data length are output to the laser printer 1 in step #505. Then, the status of the laser printer 1 is again read in step #506. If the status does not indicate an error state in step #507, and said status is found to be a wait state in step #508, the laser printer 1 status is read again in step #509, and a ready state is awaited in step #510.

When a ready state is found in step #510, a check is made to detect the existence of the print data DA and DB in step #511. If print data for output exist, the routine returns to step #505, and the next data are output.

Among the processes executed by the CPU 11 in the first embodiment described above, step #66 of the data process B corresponds to the operation of the print pause means, and steps #12 through 17 correspond to the operation of the interrupt printing means. Furthermore, step #12 and steps #18 through 23 correspond to the operation of the resume printing means.

On the other hand, among the processes executed by the CPU 11 in the second embodiment, step #313 corresponds to the operation of the interrupt allowing means during printing, and steps #336 and 366 correspond to the operation of the pause means during printing. Furthermore, steps #314 through 325 correspond to the operation of the interrupt printing means and the resume printing means.

Although an interrupt for a subsequent printing process is allowed by satisfying the condition of equation (1) in the second embodiment, said interrupt may be allowed by suitably selected reference criteria. For example, when the copy number is used as a reference criterium in the print conditions, the copy number specified during printing and the number of remaining sheets to be printed may be respectively designated N1 and n1, and the copy number specified for a subsequent print request may be designated N2, such that an interrupt may be allowed by conditional equations such as N2<N1, N2<n1, N2< a specified number of sheets (for example, several pages), N1−N2> a specified number of sheets, n1−N2> a specified number of sheets, and the like. Furthermore, an interrupt may be disabled when N1 or n1 is less than a predetermined number of sheets.

Still further, selections such as paper size, fonts and the like that does not require paper replacement or font transfers can be used as criteria for other printing conditions in the second embodiment. Alternatively, the number of sheet for printing and other print conditions may also be used in suitable combinations.

The value of the parameter PARA is not restricted to the value "10" used as an example in the second embodiment, and may be modified according to the conditions under which the printing system PS is used. Furthermore, degrees of priority may be provided between the interface 14A and the interface 14B.

The printing system of the present invention provides that when print data DA are input from the host 2A during an on-going printing process for the host 2B, the executing printing process can be paused at every page break, and can pause during a one page process without wasting paper P.

The printing system of the present invention further allows that when print conditions are pre-stored in the backup areas E2A and E2B during a pause in the printing process for hosts 2A and 2B, the print conditions to be read from the backup areas E2A and E2B when restarting said printing processes. This arrangement allows readily accelerates the printing operation without increasing the work load of the operator because the print conditions need not be reset when restarting the printing process after pausing.

In the first and second embodiments of the invention, key switches or the like may also be provide on an operation panel for setting priority rankings between the interfaces 14A and 14B. this arrangement may be very convenient for the operator if a means for indicating the set priority rankings is provided on the operation panel. Furthermore, operating efficiency may be improved when connecting (setting up) hosts 2A and 2B if the priority rankings are displayed near the connectors 15A and 15B via LEDs or the like.

Although a priority ranking was set between the interfaces 14A and 14B in the first and second embodiments of the invention, the printing processes of the interfaces 14A and 14B may be interrupted equally without setting a priority ranking.

Although the priority ranking between the interfaces 14A and 14B were changeable via dip switches in the first and second embodiment, said priority ranking may alternatively be made fixed. In such an instance, giving priority to interfaces 14A and 14B corresponding to the connectors 15A and 15B on the right side viewed form the front of the laser printer 1 enhances operation characteristics and accessible cable connections for cables 3A and 3B so as to be generally advantageous.

Although a laser printer 1 connectable to two hosts 2A and 2B was used as an example in the first and second embodiments, said laser printer may alternatively be connectable to three or more external devices.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A method performed in a printing apparatus comprising an image forming device which forms images based on print data transmitted from first and second external devices; said method comprising the steps of:

determining whether to allow the pause of the image forming process of the print data received from the first external device or not according to a type of font of print data received from the second external device when the print data is transmitted from the second external device during the image forming process of the print data received from the first external device;

automatically pausing the image forming process executed by the image forming device in response to the type of font of print data being received from the second external device and in response to the allowance of the pause of the image forming process;

executing the image forming process based on the print data received from the second external device after the pause of the image forming process based on the print data received from the first external device; and resuming the image forming process based on the print data received from the first external device after the completion of the image forming process based on the print data received from the second external device.

2. A printing apparatus comprising:

an image forming device which forms images based on print data transmitted from first and second external devices;

a controller which determines whether to allow a pause of a currently executing image forming process of the print data received from the first external device responsive to at least one of a size of printed papers for the print data received from the second external device and a printing font of the print data received from the second external device when print data is transmitted from the second external device during the image forming process of the print data received from the first external device, and when the pause of the image forming process is allowed, automatically pauses the image forming process executed by the image forming device and executes an image forming process based on the print data received from the second external device, and resumes the image forming process based on the print data received from the first external device after the completion of the image forming process based on the print data received from the second external device.

3. A method performed in a printing apparatus comprising an image forming device which forms images based on print data transmitted from first and second external devices; said method comprising the steps of:

determining whether to allow the pause of the image forming process of the print data received from the first external device or not according to a type of font of the print data received from the second external device and a type of font of the print data of the currently executing image forming process when the print data is transmitted from the second external device during the image forming process of the print data received from the first external device;

automatically pausing the image forming process executed by the image forming device in response to the type of font of print data being received from the second external device and in response to the allowance of the pause of the image forming process;

executing the image forming process based on the print data received from the second external device after the pause of the image forming process based on the print data received from the first external device; and resuming the image forming process based on the print data received from the first external device after the completion of the image forming process based on the print data received from the second external device.

4. A printing apparatus comprising:

an image forming device which forms images based on print data transmitted from first and second external devices;

a controller which determines whether to allow a pause of a currently executing image forming process of the print data received from the first external device responsive to at least one of a comparison of a size of printed papers for the print data received from the second external device to a size of printed papers for the print data received from the first external device and a comparison of a printing font of the print data received from the second external device and a type of font of the print data of the currently executing image forming process when print data is transmitted from the second external device during the image forming process of the print data received from the first external device, and when the pause of the image forming process is allowed, automatically pauses the image forming process executed by the image forming device and executes an image forming process based on the print data received from the second external device, and resumes the image forming process based on the print data received from the first external device after the completion of the image forming process based on the print data received from the second external device.

* * * * *